United States Patent
Baloche et al.

[11] Patent Number: 5,984,413
[45] Date of Patent: Nov. 16, 1999

[54] HINGE MECHANISM FOR VEHICLE SEAT, AND VEHICLE SEAT FITTED WITH SUCH A MECHANISM

[75] Inventors: François Baloche, La Carneille; Jean-Romain Benoit, Flers, both of France

[73] Assignee: Bertrand Faure Equipements SA, Boulogne, France

[21] Appl. No.: 09/179,583

[22] Filed: Oct. 27, 1998

[30] Foreign Application Priority Data

Oct. 31, 1997 [FR] France .................................. 97 13702

[51] Int. Cl.$^6$ ...................................................... B60N 2/22
[52] U.S. Cl. ...................................... 297/367; 297/378.12
[58] Field of Search ................... 297/367, 378.12

[56] References Cited

U.S. PATENT DOCUMENTS

| | | | |
|---|---|---|---|
| 4,502,730 | 3/1985 | Kazaoka et al. | 297/367 X |
| 5,590,931 | 1/1997 | Fourrey et al. | 297/367 X |
| 5,611,599 | 3/1997 | Baloche et al. | 297/367 |
| 5,769,494 | 6/1998 | Barrere et al. | 297/367 |
| 5,779,313 | 7/1998 | Rohee | 297/367 |
| 5,820,219 | 10/1998 | Rohee | 297/367 |
| 5,857,746 | 1/1999 | Barrere et al. | 297/367 |

FOREIGN PATENT DOCUMENTS

| | | | |
|---|---|---|---|
| 0 694 434 | 3/1996 | European Pat. Off. | B60N 2/22 |
| 0 769 409 | 4/1997 | European Pat. Off. | B60N 2/22 |
| 0 770 514 | 5/1997 | European Pat. Off. | B60N 2/22 |
| 2 218 627 | 11/1989 | United Kingdom | B60N 1/06 |

OTHER PUBLICATIONS

French Preliminary Search Report dated Jul. 1, 1998, French Appl. No. FR 9713702.

*Primary Examiner*—Peter R. Brown
*Attorney, Agent, or Firm*—Marshall, O'Toole, Gerstein, Murray & Borun

[57] ABSTRACT

This concerns a hinge mechanism comprising a fixed end plate, a movable end plate lockable by two wedges controlled by a sliding pushrod, itself activated by pivoting of a control plate in a first or second direction in order to free the movable end plate. A circular guide comprises radial breaks receiving the wedges, and holding the wedges in a withdrawn position when they disengage from the radial breaks under the pivoting effect of the control plate in the second direction, which fixes in addition the circular guide to the movable end plate. The movable end plate can thus turn freely before relocking in its initial angular position when the radial breaks of the circular guide return opposite the wedges.

10 Claims, 5 Drawing Sheets

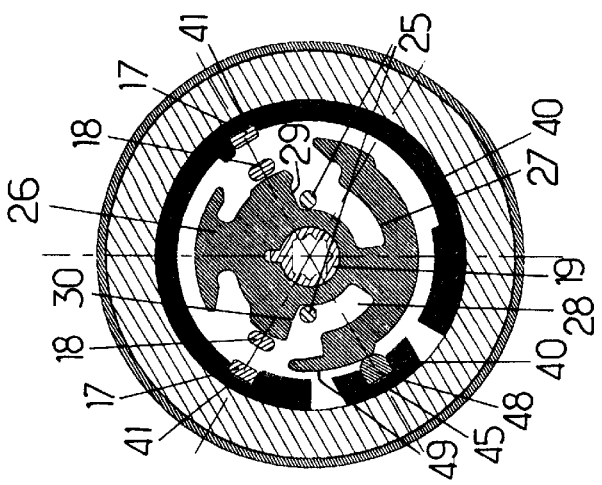
FIG.3. FIG.4.
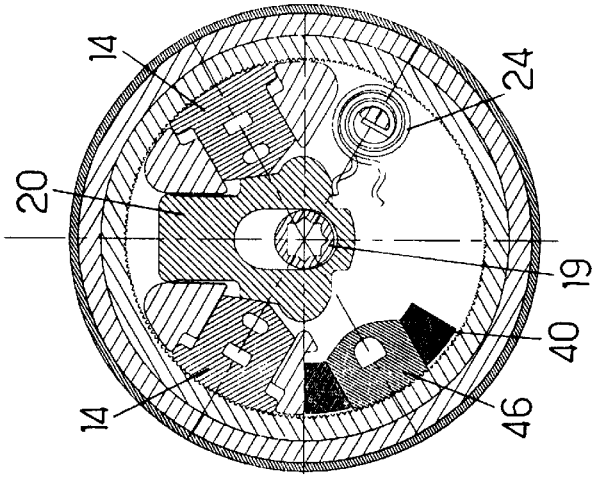
FIG.5.
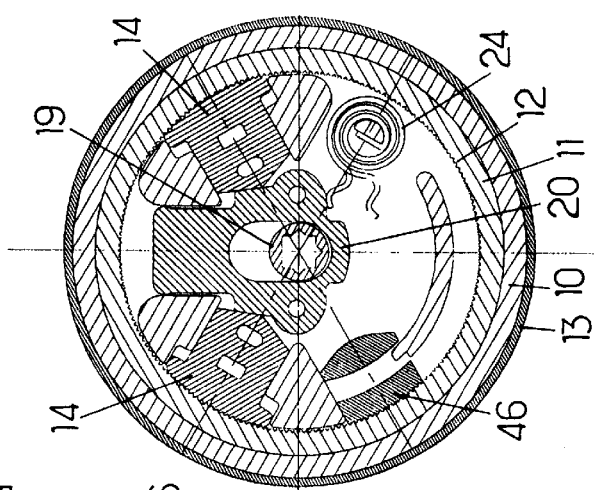
FIG.6.
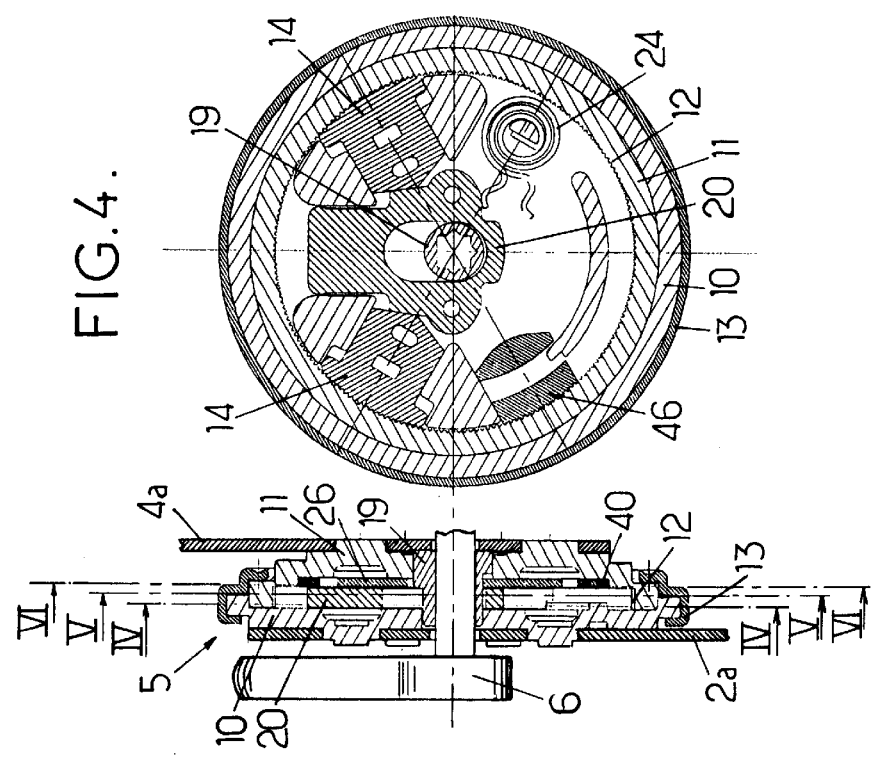

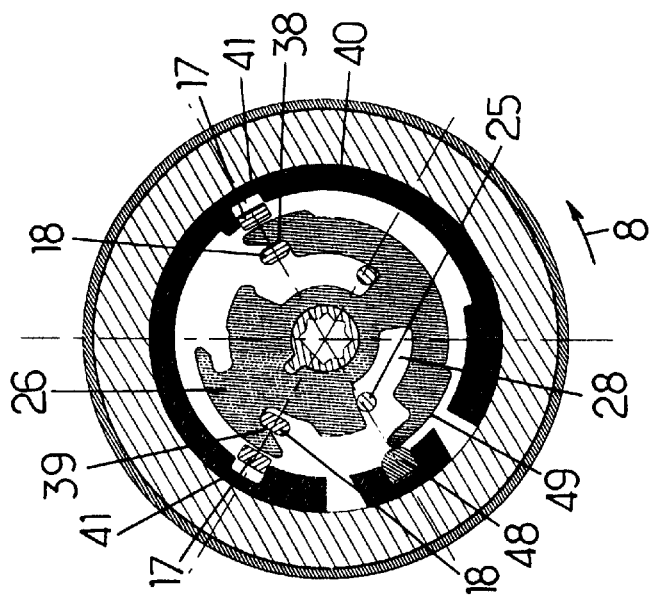
FIG.10. FIG.11. FIG.12.
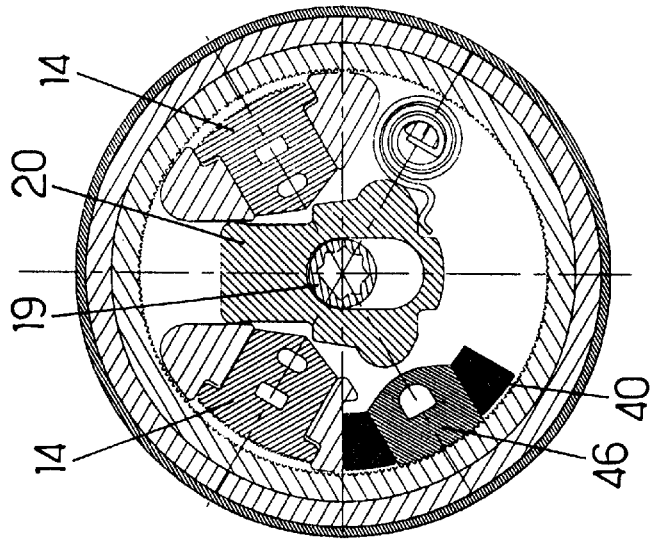
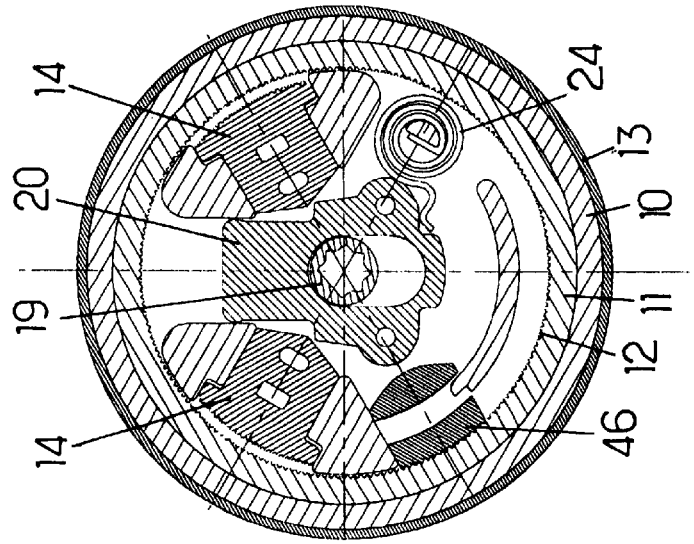

HINGE MECHANISM FOR VEHICLE SEAT, AND VEHICLE SEAT FITTED WITH SUCH A MECHANISM

FIELD OF THE INVENTION

The present invention relates to hinge mechanisms for vehicle seats, and to vehicle seats fitted with such mechanisms.

More particularly, the invention concerns a hinge mechanism intended to equip a vehicle seat which includes on the one hand a seat and on the other hand a back pivoting relative to the seat, this mechanism comprising:

first and second end plates, one intended to be fixed to the seat and the other to the back, these end plates being pivoted relative to each other around a rotational axis, the second end plate being fixed in a permanent manner with a toothed segment which extends over at least an arc of a circle centered on the rotational axis and which is orientated radially inwards.

at least one locking wedge provided with a toothed segment suitable to mesh with the toothed segment of the second end plate, this locking wedge being guided to slide radially by a guide integral with the first end plate, between on the one hand an engagement position where the toothed segment of the locking wedge meshes with the toothed segment of the second end plate in order to lock the mechanism, and on the other hand a withdrawn position where the toothed segment of the locking wedge does not mesh with the toothed segment of the second end plate, this locking wedge comprising in addition a first peg projecting axially towards the second end plate, a locking part for controlling the sliding of the locking wedge, this locking part being assisted by elastic means to a rest position where the aforesaid locking part places the locking wedge in its engagement position, and the aforesaid locking part being movable to an activating position where it allows the locking wedge to slide towards its withdrawn position, a maneuvering part for moving the locking part from its rest position to an activating position where the aforesaid locking part allows the locking wedge to slide towards its withdrawn position, means for moving the locking wedge radially inwards when the locking part is in the activating position, and a circular guide which is mechanically connected to the second end plate and engages with the first peg in a manner to positively hold the locking wedge in its withdrawn position when this locking wedge is in a pre-determined range of angular positions relative to the aforesaid circular guide, this circular guide having at least one break in which the first peg can be engaged when the locking wedge is not in the aforesaid pre-determined range of angular positions, by allowing then the locking wedge to slide radially outwards to its engagement position.

BACKGROUND OF THE INVENTION

The document EP-A-0 770 514 describes an example of such a hinge mechanism, which can stay unlocked even after releasing the control part when the seat back is tipped forward, for example in order to access rear places in the vehicle if the mechanism in question is assembled on a front seat. When the back is then set upright again, the mechanism automatically re-locks itself as soon as the first peg comes opposite the corresponding break of the circular guide.

The mechanism described in this document gives complete satisfaction, but has however the disadvantage of always re-locking in the same angular position of the back when this back is set upright again after having tipped it forward, and this regardless of the previous adjustment of the aforesaid back.

The user of the seat must therefore again adjust the inclination of his back each time he sets it upright again after having tipped it forward.

Furthermore, the document EP-A-0 694 434 describes a hinge mechanism with toothed wedges which allows tipping the seat back forward and which automatically re-locks in the previously adjusted position of the back: this mechanism operates perfectly, but the toothed wedges of this mechanism, which allow the adjustment of the back inclination, mesh with a toothed segment which is itself movable relative to the second end plate and which is interlocked with this second end plate by means of other toothed wedges.

In this case, the two end plates are therefore connected to each other by means of two stages of toothed wedges, which tends to make the mechanism heavier and more complex.

OBJECTS AND SUMMARY OF THE INVENTION

The present invention therefore has the object of proposing a hinge mechanism of the type of that described in the document EP-A-0 770 514, but which can automatically re-lock itself in the last adjusted position of the seat back when this back is set upright again after having been tipped forward, and this by retaining only one stage of toothed wedges.

To this end, in accordance with the invention, a device of the type in question is essentially characterized in that:

the circular guide is formed by a radially internal edge belonging to a so-called memorizing equipment which is pivoted relative to the first and second end plates about the rotational axis, this memorizing equipment comprises a first radial guide which adjoins the break of the circular guide, the first peg being able to slide radially in this guide, more or less without play in the circumferential direction, the memorization equipment comprises in addition a second radial guide and a so-called memorization wedge provided with a toothed segment suitable for meshing with the toothed segment of the second end plate, the memorization wedge being sliding mounted in the second radial guide between on the one hand, an engagement position where this memorization wedge meshes with the toothed segment of the second end plate in order to immobilize the memorization equipment relative to this second end plate, and on the other hand a withdrawn position where the memorization wedge does not mesh with the toothed segment of the second end plate and allows relative rotation between the memorization equipment and the second end plate, a control plate connected to the maneuvering part is pivoted about the rotational axis, this control plate being movable from a rest position, either in a first angular direction to a first active position, or in a second angular direction to a second active position, this control plate being assisted elastically towards its rest position, the aforesaid control plate engaging with the locking wedge in order to prevent this locking wedge from moving radially inwards to a point where the first peg would be able to disengage from its radial guide when the control plate is in its first active position, and in order to allow the locking wedge to move radially inwards to a position where the first peg can disengage from its radial guide in order to slide against the circular guide when the control plate is in its second active position, the locking part is sliding mounted relative to the first end plate and is mechanically connected to the control plate, so that the locking part drives back the control plate into its rest position when the aforesaid locking part is itself in its rest position, and so that the control plate drives back the locking part into its activating position when the aforesaid control plate is in one of its active positions, the control plate engages the memorization wedge in order to hold this wedge in its engagement position when the aforesaid control plate is moved into its second active position without relative rotation between the first and second end plates, and in order to allow the memorization wedge to move into its withdrawn position when the aforesaid control plate is moved to its first active position, and when the control plate is placed in its second active position and the second end plate has undergone a relative rotation with respect to the first end plate in a pre-determined angular direction, called the tipping direction, the memorization wedge engages with a circular arc guide which is centered on the rotational axis and which is integral with the first end plate in order then to hold the memorization wedge in its engagement position, so that the memorization equipment follows then the second end plate, the memorization wedge not engaging with the circular arc guide when the first peg of the locking wedge is engaged in the first radial guide.

By means of these arrangements, when the user of the seat wishes to adjust the inclination of its back, he acts on the maneuvering part in the first direction, which unlocks the locking wedge, which remains integral with the memorization equipment.

On the other hand, when the user of the seat wants to tip the seat forwards to the maximum, he acts on the maneuvering part in the second direction, which not only unlocks the locking wedge, but also enables the first peg of this wedge to disengage from its radial guide. At the same time, the memorization wedge is held meshed with the toothed segment of the second end plate, by locking the memorization equipment in the position corresponding to the last adjusted position of the seat back.

When the back next tips forward, the circular guide belonging to the memorization equipment slides against the first peg of the locking wedge, by holding the aforesaid locking wedge in its withdrawn position, even after releasing the maneuvering part.

Subsequently, when the back is tipped backwards, the circular guide of the memorization plate slides again against the first peg, until the first radial guide reaches the level of the first peg of the locking wedge, which allows the locking wedge to return to mesh with the toothed segment of the second end plate: the back is thus again locked in the position initially adjusted by the user.

In the invention preferred versions, recourse can possibly be made in addition to one and/or other of the following arrangements:

the locking wedge comprises a second peg which projects axially towards the second end plate and the control plate comprises first and second indentations located either side the second peg, the first indentation being adapted to receive the aforesaid second peg when the control plate is moved into its first active position, the aforesaid first indentation comprising a cam edge directed radially inwards which engages then with the second peg in order to drive back the locking wedge to its withdrawn position, and the first indentation comprising in addition an stop edge directed radially outwards which prevents the first peg from leaving the first radial guide when the control plate is in its first active position, the second indentation being adapted to receive the aforesaid second peg when the control plate is moved into its second active position, and the aforesaid second indentation comprising a cam edge directed radially inwards which engages then with the second peg in order to drive back the locking wedge to its second withdrawn position by making the first peg leave the first radial guide;

the mechanism comprises two identical locking wedges which are located symmetrically in relation to the locking part;

the locking part comprises two pegs which project axially towards the second end plate and which penetrate respectively into two cutouts in the control plate, these two cut-outs each having approximately a circular arc shape centered on the rotational axis, and the aforesaid cut-outs each comprising an angular end provided with an edge which is adjacent to the corresponding peg of the locking part when the aforesaid locking part and the control plate are in their respective rest positions;

the maneuvering part includes a central shaft on which the locking part slides, the aforesaid locking part sliding besides in a guide fixed to the first end plate;

the memorization wedge comprises a peg which projects axially towards the second end plate and on which acts an external support edge belonging to the control plate when the aforesaid control plate is moved into its second active position without relative rotation between the first and second end plates, in order to hold then the memorization wedge in the engagement position;

the circular arc guide which engages the memorization wedge includes an edge which is directed radially outwards, against which slides an edge which is directed radially inwards and which belongs to the memorization wedge;

the circular guide which engages the first peg of the locking wedge has a stop projecting radially inwards at the level of the break of this circular guide, only from one side of the aforesaid break, so that, when the first peg of the locking wedge leaves the first radial guide, the second end plate can pivot in the angular direction of tipping relative to the first end plate, then in an opposite angular direction, until the first peg of the locking wedge encounters the aforesaid circular guide stop, after which the aforesaid first peg can engage again in the first radial guide.

Furthermore, another object of the invention is a vehicle seat including, on the one hand, a seat and on the other hand, a back pivoted on the seat by means of at least one hinge mechanism such as defined above, the first and second end plates of which are fixed one to the seat and the other to the back.

BRIEF DESCRIPTION OF THE DRAWINGS

Other characteristics and advantages of the invention will appear during the following description of one of its versions, given as a non-restrictive example, with regard to the appended drawings.

On the drawings:

FIG. 3 is an axial section view of the mechanism of FIG. 2, in the locked position;

FIGS. 4 to 6 are section views, respectively along lines IV—IV, V—V and VI—VI, of the mechanism of FIG. 3, also in the locked position;

FIGS. 10 to 12 are similar views to FIGS. 4 to 6, when the mechanism is activated to enable a complete folding down forward of the seat back, but before this folding down has taken place;

and FIGS. 12 to 15 are similar views to FIGS. 10 to 12, during the folding down forward of the back.

MORE DETAILED DESCRIPTION

On the different figures the same references designate identical or similar components.

Figure 1:
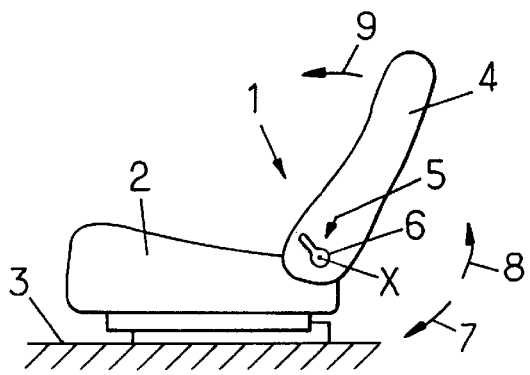
FIG. 1 is a diagrammatic view of a vehicle seat fitted with a hinge mechanism in accordance with one version of the invention

As is shown diagrammatically in FIG. 1, the invention concerns a vehicle seat 1, particularly an automobile front seat, which comprises on the one hand a seat 2 mounted on the vehicle floor 3, and on the other hand a back 4 pivoted on the seat 2 about a transverse horizontal axis X.

The pivoting of the back 4 is obtained by means of a hinge mechanism 5 controlled by a handle 6, and preferably by means of two identical or similar hinge mechanisms located on either side the back and controlled by the same handle 6.

The pivoting of the aforesaid handle 6 in an angular direction 7 enables a user to adjust the inclination of the back 4, by acting directly on this back, whereas the pivoting of the handle 6 in the opposite angular direction 8 enables the back 4 to be completely folded down forward, in the direction 9, particularly in order to facilitate access to the rear places of the vehicle when this vehicle only has two front doors.

Figure 2:
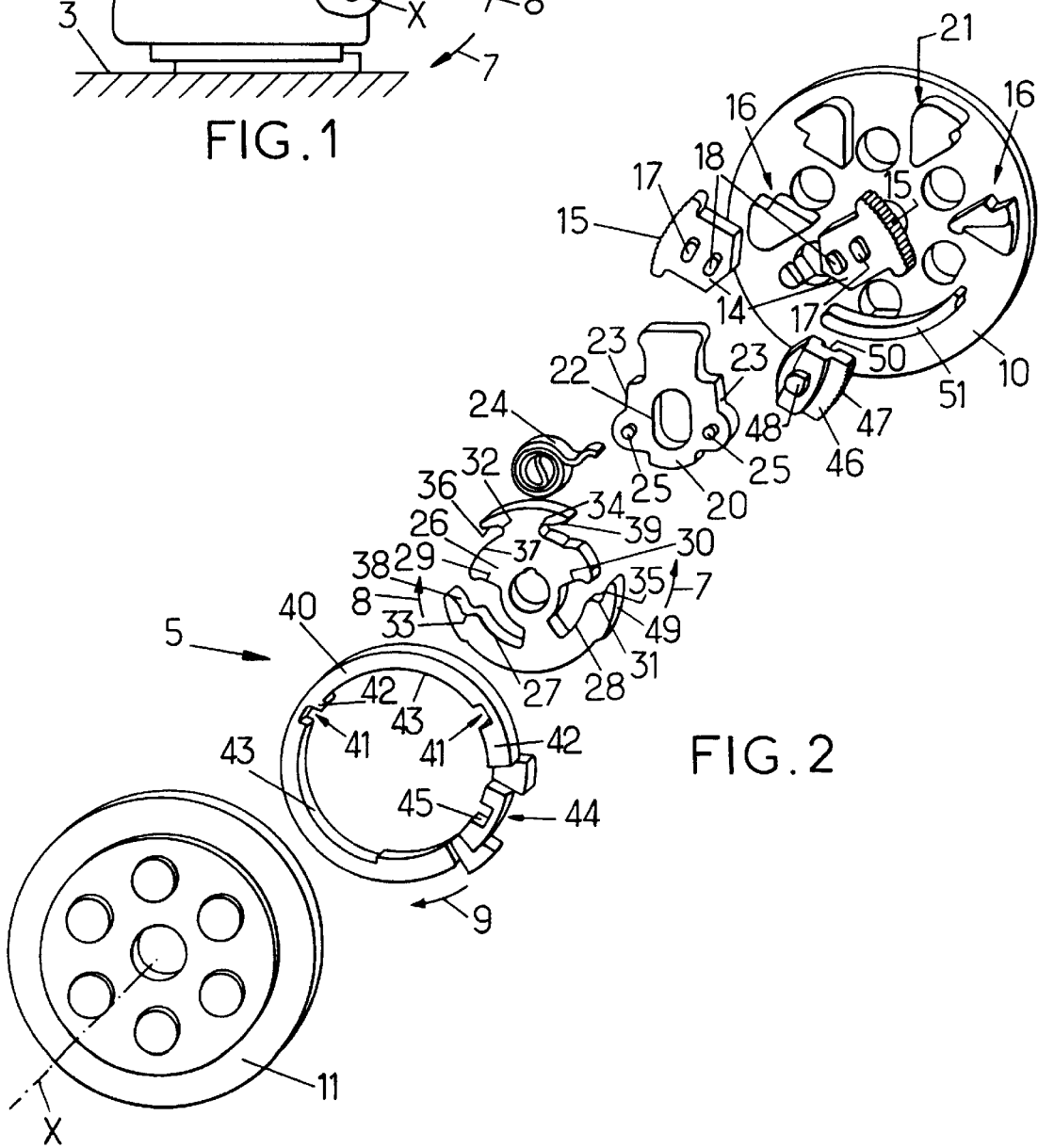
FIG. 2 is a partial exploded view of the hinge mechanism fitting the seat of FIG. 1.

As shown in FIGS. 2 and 3, the hinge mechanism 5 comprises:

a fixed metal end plate 10 perpendicular to the axis X, which is integral with the rigid frame 2a of the seat;

a movable metal end plate 11 perpendicular to the axis X, which is integral with the rigid frame 4a of the back and which is provided with an internal circular toothed segment 12 centered on the axis X;

a metal ring 13, which is crimped on the perimeter of the fixed and movable end plates delimiting with them a closed circular casing;

two metal locking wedges 14 which are arranged approximately at 120° to each other and which each have an external toothed segment 15 adapted to mesh with the toothed segment 12 of the movable end plate, each of these wedges being mounted to slide radially in a guide 16 integral with the fixed end plate, between, on the one hand, an engagement position where the toothed segment 15 of the wedge meshes with the toothed segment of the movable end plate in order to lock the mechanism, and on the other hand a withdrawn position where the wedge 14 does not mesh with the toothed segment 12 of the movable end plate, each of these wedges 14 comprising in addition first and second pegs 17, 18 projecting axially towards the movable end plate 11, the second peg 18 being arranged radially towards the inside of the first peg 17;

a control shaft 19 which is pivoting mounted along the axis X and which is integral with the handle 6;

a locking part 20 which has the form of an indented and stamped metal plate arranged in the same plane as the locking wedges 14, this locking part being mounted radially sliding in a guide 21 integral with the fixed end plate 10, in a sliding direction corresponding to the median of the sliding directions of the locking wedges 14, and the control part being drilled with an oblong hole 22 which extends longitudinally in the sliding direction of the aforesaid locking part and which is passed through by a circular part of the control shaft 19, the locking part 20 comprising in addition two lateral support surfaces 23 which are shaped in order to drive back the locking wedges 14 to their engagement position by wedging, when the locking part 20 is driven back radially outwards, towards a rest position, under the action of a spring 24 mounted on the fixed end plate 10, and the locking part 20 comprising finally two pegs 25 which project axially towards the movable end plate 11 and which are arranged either side the oblong hole 22;

an indented metal control plate 26 which extends in a plane parallel to the locking part 20 and which is interposed between this locking part and the movable end plate 11, the control plate rotating integrally with the control shaft 19, the control plate 26 comprising two circular arc cut-outs 27, 28 which are centered on the rotational axis X and which each receive one of the pegs 25 of the locking part, each of these cut-outs having an end edge, respectively 29, 30, which acts on the corresponding peg 25 in order to drive back the locking part 20 radially inwards to an activating position when the handle 6 is turned in one or other of the angular directions 7, 8, which then allows the locking wedges 14 to slide towards their withdrawn position, the control plate 26 comprising in addition, on either side the second peg 18 of each locking wedge 14, a first indentation, respectively 31, 32, and a second indentation, respectively 33, 34, each of the first indentations 31, 32 having a cam edge directed radially inwards, respectively 35, 36, which is adapted to act on the second peg 18 of the corresponding wedge14 in order to move this wedge to its withdrawn position when the handle 6 turns in the angular direction 7, and at least one 32 of the first indentations has in addition a stop edge directed radially outwards which is adapted to engage the second peg 18 of the corresponding locking wedge, in order to limit the movement of this wedge radially inwards, and each of the second indentations 33, 34 comprising in addition a cam edge, respectively 38, 39, engaging with the second pegs 18 of the wedges 14 in order to move these wedges towards their withdrawn position when the handle 6 turns in the angular direction 8, a memorization equipment 40, which is in the shape of an indented and stamped metal ring arranged around the control plate 26, this memorization equipment comprising internally two notches 41 which each constitute a radial guide for the first peg 17 of the corresponding locking wedge 14, the memorization equipment 40 comprising in addition two stops 42 projecting radially inwards and adjacent respectively to the two notches 41 the stops 42 both being located on the same side of their respective notch 41, the memorization equipment 40 comprising in addition two circular guides 43 directed radially inwards and each extending over slightly less than 120° from one of the notches 41, opposite the corresponding stop 42, and the memorization equipment 40 comprising in addition a radial guide 44 made by stamping, connected to a notch 45 directed radially inwards, and a metal memorization wedge 46 which is sliding mounted in the radial guide 44 of the memorization equipment and which is provided with an external toothed segment 47 suitable for meshing with the internal toothed segment 12 of the movable end plate when the aforesaid memorization wedge is in an engagement position, the memorization wedge comprising in addition a peg 48 housed in the notch 45 of the memorization equipment, which projects towards the movable end plate 11 and which can engage an external support edge 49 of the control plate in order to hold the memorization wedge 46 in its engagement position when the aforesaid control plate turns in the angular direction 8, and the memorization wedge 46 comprising in addition a circular arc groove 50 centered on the axis X, which engages on the circular arc rib 51 also centered on the axis X when the back is folded down in the direction 9, in order to hold in this way the memorization wedge 46 in its engagement position.

The device which has just been described functions as follows:

In the rest position, as shown in FIGS. 4 to 6, the locking part 20 is held in its rest position by the spring 24, by driving back the two locking wedges 14 to their engagement position, and by also holding the control plate 26 in its rest position by engagement of the pegs 25 of the locking part and the end edges 29, 30 of the control plate.

Furthermore, in this position, the external edge 49 of the control plate 26 acts on the peg 48 of the memorization wedge 46 in order also to hold this memorization wedge in its engagement position.

In addition, in this position, the first pegs 17 of the locking wedges are then in the notches 41 of the memorization equipment 40, and the peg 48 of the memorization wedge is in the notch 45 of the aforesaid equipment.

Figures 7, 8, 9:
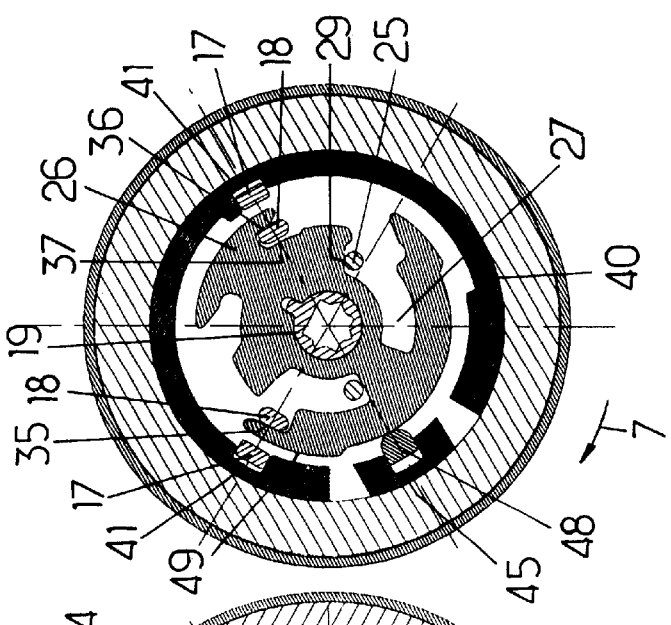
FIGS. 7 to 9 are similar views to FIGS. 4 to 6, showing the state of the device during adjustment of the inclination of the seat back.

When the user of the seat 1 wishes to adjust the inclination of the back, he activates the handle 6 in the angular direction 7, as shown in FIGS. 7 to 9.

The control plate 26 pivots then in the direction 7 and the end edge 29 of the cut-out 27 is supported on the corresponding peg 25 of the locking part 20, which moves this part to its activating position by allowing the two locking wedges 14 to slide radially inwards as far as their withdrawn position.

This movement of the two locking wedges 14 is moreover positively controlled by the engagement between the cam edges 35, 36 of the control plate and the pegs 18 of the two locking wedges, whereas the stop edge 37 of the control plate prevents the peg 17 of one of the locking wedges from leaving the corresponding notch 41.

In addition, in this position, the external support edge 49 of the control plate is no longer opposite the peg 48 of the memorization wedge, so that this memorization wedge can slide radially inwards to a withdrawn position as soon as a pivoting couple is applied to the back, the peg 48 remaining nevertheless engaged in the notch 45 of the memorization equipment.

When the user acts on the back 4 in order to adjust the inclination, the memorization equipment remains therefore fixed to the fixed end plate 10 by means of at least one of the pegs 17, whereas the movable end plate 11 turns freely as long as the handle is held activated.

In addition, when the user of the seat wishes to fold down the back 4 completely forward, in the direction of tipping 9, he activates the handle 6 in the angular direction 8, as shown in FIGS. 10 to 12.

The control plate 26 turns then in the angular direction 8, so that the end edge 30 of the cut-out 28 supports the corresponding peg 25 by moving the locking part into its activating position.

Furthermore, the cam edges 38, 39 of the control plate then act on the pegs 18 of the locking wedges 14 in order to move these wedges radially inwards, sufficiently to make the pegs 17 of the locking wedges exit out of the notches 41 of the memorization equipment.

Finally, in this position, the external support edge of the control plate 26 still engages the peg 48 of the memorization wedge, by holding this memorization wedge in mesh with the internal toothed segment 12 of the movable end plate.

Figure 13:
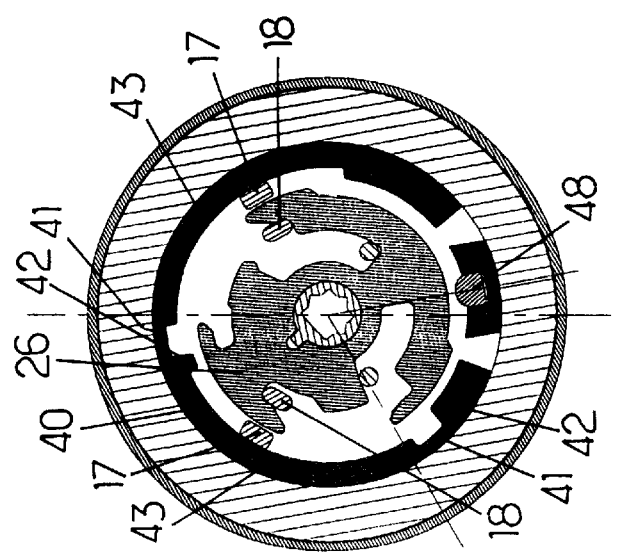
Figure 14:
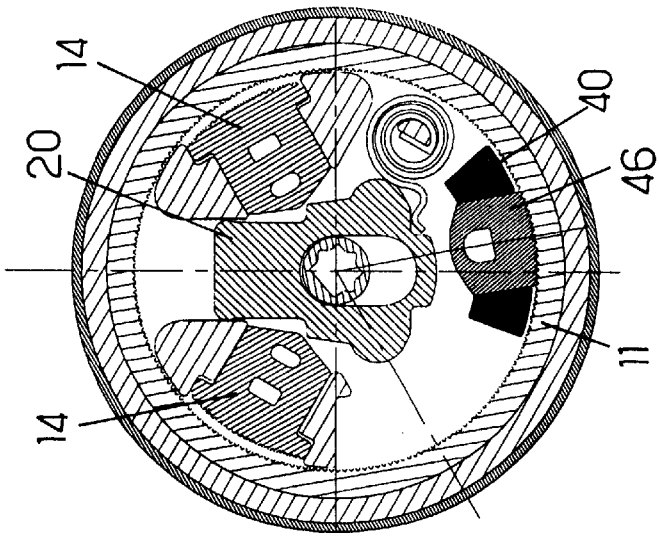
Figure 15:
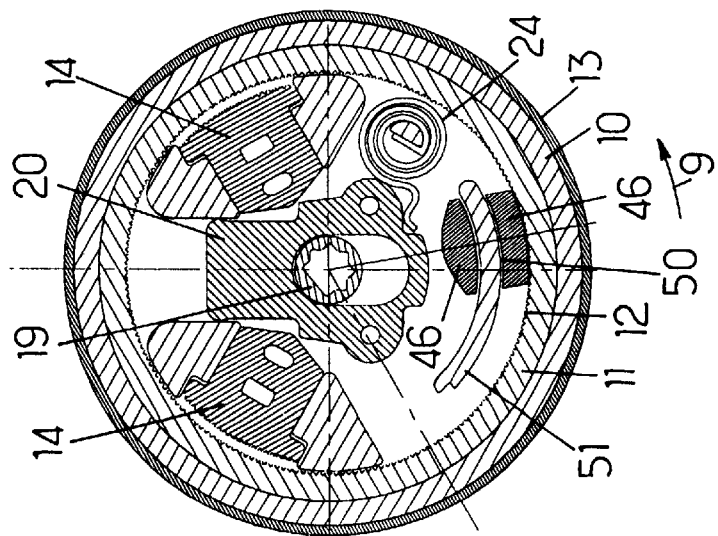

When afterwards the back is tipped in the direction 9, as shown in FIGS. 13 to 15, the memorization equipment 40 turns with the movable end plate 11, the memorization wedge 46 being held in mesh with the internal toothed segment 12 of the movable end plate by engagement of the groove 50 of the aforesaid wedge on the circular arc rib 51 of the fixed end plate.

At the same time, the locking wedges are held in their withdrawn position by engagement between the circular guides 43 of the memorization equipment, and the pegs 17 of the locking wedges, this also holding the locking part 20 in the activating position, even after releasing the handle 6.

When the user raises the back 4 of the seat after folding it down forward, the stops 42 of the memorization equipment stop the raising movement of the back as soon as the pegs 17 are opposite the notches 41, after which the pegs engage again in the aforesaid notches and the mechanism re-locks in the position shown in FIGS. 4 to 6, by remembering the angular position previously adjusted by the user.

What is claimed is:

1. A hinge mechanism for a vehicle seat having a seat and a back pivoting relative to the seat, the hinge mechanism comprising:

first and second end plates wherein one of the plates is adapted to be fixed to the seat and the other plate is adapted to be fixed to the back, the end plates being pivoted relative to each other around a rotational axis, the second end plate having a toothed segment extending over at least a portion of a circular arc centered on the rotational axis and directed radially inwards, at least one locking wedge having a toothed segment for meshing with the toothed segment of the second end plate, the locking wedge being guided by a guide integral with the first end plate to radially slide between an engagement position where the toothed segment of the locking wedge meshes with the toothed segment of the second end plate to lock the hinge mechanism and a withdrawn position where the toothed segment of the locking wedge does not mesh with the toothed segment of the second end plate, the locking wedge further comprising a first peg projecting axially towards the second end plate, a locking part for controlling the sliding of the locking wedge, the locking part being urged towards a first rest position that places the locking wedge in the engagement position, and the locking part being movable to an activating position that allows the locking wedge to slide towards the withdrawn position, an actuating member for moving the locking part from the first rest position to the activating position, means for moving the locking wedge radially inwards when the locking part is in the activating position, and a circular guide coupled to the second end plate and engaged with the first peg to positively hold the locking wedge in the withdrawn position when the locking wedge is in a predetermined range of angular positions relative to the circular guide, the circular guide having at least one notch that engages the first peg when the locking wedge is not in the predetermined range of angular positions by allowing the locking wedge to slide radially outwards to the engagement position, the circular guide being formed by an internal radial edge belonging to a memorization assembly which is pivoted relative to the first and second end plates around the rotational axis;

the memorization assembly comprises a first radial guide which engages the notch of the circular guide, the first peg being adapted to slide radially in the first radial guide substantially without play in the circumferential direction;

the memorization assembly further comprises a second radial guide and a memorization wedge having a toothed segment for meshing with the toothed segment of the second end plate, the memorization wedge being slidably mounted in the second radial guide to slide between a second engagement position where the memorization wedge engages the toothed segment of the second end plate to immobilize the memorization assembly relative to the second end plate and a second withdrawn position where the memorization wedge does not engage the toothed segment of the second end plate and enables relative rotation between the memorization assembly and the second end plate, a control plate coupled to the actuating member pivots around the rotational axis, the control plate being movable between a first active position and a second active position and urged towards a second rest position, the control plate engaging the locking wedge to prevent the locking wedge from moving radially inwards to a point where the first peg is disengaged from the radial guide when the control plate is in its first active position and to enable the locking wedge to move radially inwards to a position where the first peg can disengage from the radial guide to slide against the circular guide when the control plate is in the second active position, the locking part being slidably mounted relative to the first end plate and coupled to the control plate so that the locking part urges the control plate into the second rest position when the locking part is in the first rest position, and so that the control plate drives the locking part into the activating position when the control plate is in one of the first and second active positions, the control plate being engaged with the memorization wedge to hold the memorization wedge in the second engagement position when the control plate is moved into the second active position without relative rotation between the first and second end plates and to allow the memorization wedge to move into the second withdrawn position when the control plate is moved to the first active position, and when the control plate is in the second active position and the second end plate has undergone a relative rotation in relation to the first end plate in a predetermined angular direction the memorization wedge engages with a circular arc guide which is integral with the first end plate to hold the memorization wedge in the second engagement position so that the memorization assembly follows then the second end plate, the memorization wedge not engaging with the circular arc guide when the first peg of the locking wedge is in the first radial guide.

2. A hinge mechanism according to claim 1, wherein the locking wedge comprises a second peg which projects axially towards the second end plate and the control plate comprises first and second indentations arranged on either side with the second peg, the first indentation being adapted to receive the second peg when the control plate is moved into the first active position, the first indentation comprising an edge cam directed radially inwards which engages with the second peg to urge the locking wedge toward the first withdrawn position, and the first indentation comprising a stop edge directed radially outwards to prevent the first peg from leaving the first radial guide when the control plate is in the first active position, the second indentation being adapted to receive the second peg when the control plate is moved into the second active position, and the second indentation comprising an edge cam directed radially inwards to engage with the second peg to drive the locking wedge to the first withdrawn position by making the first peg leave the first radial guide.

3. A hinge mechanism according to claim 1 further comprising a second locking wedge such that the first and second locking wedges are arranged symmetrically in relation to the locking part, the second locking wedge having a third engagement position and a third withdrawn position.

4. A hinge mechanism according to claim 3, wherein the locking part engages with the two locking wedges by a wedging effect to urge them back to their respective engagement positions.

5. A hinge mechanism according to claim 1, wherein the locking part comprises two pegs which project axially towards the second end plate and which penetrate respectively into two openings arranged in the control plate, the openings each having a circular arc shape centered on the rotational axis and comprising an angular end provided with an edge which is adjacent to the corresponding peg of the locking part when the locking part and the control plate are in their respective rest positions.

6. A hinge mechanism according to claim 1, wherein the actuating member includes a central shaft on which slides the locking part.

7. A hinge mechanism according to claim 1, wherein the memorization wedge comprises a projection which projects axially towards the second end plate and on which acts an external support edge belonging to the control plate when the control plate is moved to the second active position without relative rotation between the first and second end plates to hold the memorization wedge in the second engagement position.

8. A hinge mechanism according to claim 1, wherein the circular arc guide includes an edge which is directed radially outwards, against which slides an edge directed radially inwards belonging to the memorization wedge.

9. A hinge mechanism according to claim 1, wherein the circular guide which engages with the first peg of the locking wedge has a stop projecting radially inwards at the level of the notch of the circular guide, only from one side of the aforesaid notch, so that when the first peg of the locking wedge leaves the first radial guide the second end plate can pivot in relation to the first end plate, then in an opposite angular direction until the first peg of the locking wedge encounters the stop of the circular guide, after which the first peg can engage in the first radial guide.

10. A vehicle seat including a seat and a back pivoted on the seat by means of at least one hinge mechanism according to claim 1, wherein one of the first and second end plates as fixed to the seat and the other end plate is fixed to the back.

* * * * *